(12) United States Patent
Baby et al.

(10) Patent No.: US 7,991,768 B2
(45) Date of Patent: Aug. 2, 2011

(54) GLOBAL QUERY NORMALIZATION TO IMPROVE XML INDEX BASED REWRITES FOR PATH SUBSETTED INDEX

(75) Inventors: Thomas Baby, Foster City, CA (US); Ning Zhang, Belmont, CA (US); Sivasankaran Chandrasekar, Palo Alto, CA (US); Nipun Agarwal, Santa Clara, CA (US); Asha Tarachandani, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 653 days.

(21) Appl. No.: 11/937,268

(22) Filed: Nov. 8, 2007

(65) Prior Publication Data
US 2009/0125494 A1  May 14, 2009

(51) Int. Cl.
G06F 7/00 (2006.01)
G06F 17/30 (2006.01)
(52) U.S. Cl. .......... 707/716; 707/746; 707/769
(58) Field of Classification Search .......... None
See application file for complete search history.

(56) References Cited

U.S. PATENT DOCUMENTS

| | | |
|---|---|---|
| 5,210,686 A | 5/1993 | Jernigan |
| 5,295,261 A | 3/1994 | Simonetti |
| 5,369,763 A | 11/1994 | Biles |
| 5,404,513 A | 4/1995 | Powers et al. |
| 5,410,691 A | 4/1995 | Taylor |
| 5,454,101 A | 9/1995 | Mackay et al. |
| 5,467,471 A | 11/1995 | Bader |
| 5,524,240 A | 6/1996 | Barbara et al. |
| 5,530,849 A | 6/1996 | Hanushevksy et al. |
| 5,544,360 A | 8/1996 | Lewak et al. |
| 5,546,571 A | 8/1996 | Shan et al. |
| 5,568,640 A | 10/1996 | Nishiyama et al. |
| 5,643,633 A | 7/1997 | Telford et al. |
| 5,680,614 A | 10/1997 | Bakuya et al. |
| 5,701,467 A | 12/1997 | Freeston |
| 5,724,577 A | 3/1998 | Exley et al. |
| 5,734,887 A | 3/1998 | Kingberg et al. |

(Continued)

FOREIGN PATENT DOCUMENTS
EP  1 241 589 A2  9/2002
(Continued)

OTHER PUBLICATIONS

"Galax: XQueryOptimization" downloaded Jan. 14, 2008 from the Internet < http://www.galaxquery.com/optimization/ >, 3 pages.

(Continued)

*Primary Examiner* — Susan Y Chen
(74) *Attorney, Agent, or Firm* — Hickman Palermo Truong & Becker LLP; Daniel D. Ledesma

(57) ABSTRACT

Techniques for processing a query that includes a path expression are provided. A query processor determines whether an XML index may be used to execute the query instead of having to scan multiple XML documents. The query is parsed and normalized, which results in multiple normalized path expressions that are based on the original path expression. If the XML index is a path-subsetted index, then the query processor generates annotated path expressions based on the normalized path expressions. The query processor determines whether each of the annotated path expressions is satisfiable by the path-subsetted XML index. If so, then the XML index is used to process the query.

18 Claims, 3 Drawing Sheets

U.S. PATENT DOCUMENTS

| | | | |
|---|---|---|---|
| 5,838,965 A | 11/1998 | Kavanagh et al. | |
| 5,842,212 A | 11/1998 | Balluvio | |
| 5,870,590 A | 2/1999 | Kita et al. | |
| 5,878,415 A | 3/1999 | Olds | |
| 5,917,492 A | 6/1999 | Bereiter et al. | |
| 5,921,582 A | 7/1999 | Gusack | |
| 5,964,407 A | 10/1999 | Sandkleiva | |
| 5,974,407 A | 10/1999 | Sacks | |
| 5,987,506 A | 11/1999 | Carter et al. | |
| 6,003,040 A | 12/1999 | Mital et al. | |
| 6,038,563 A | 3/2000 | Bapat et al. | |
| 6,055,544 A | 4/2000 | DeRose et al. | |
| 6,061,684 A | 5/2000 | Glasser et al. | |
| 6,101,500 A | 8/2000 | Lau | |
| 6,111,578 A | 8/2000 | Tesler | |
| 6,112,209 A | 8/2000 | Gusack | |
| 6,128,610 A | 10/2000 | Srinivasan et al. | |
| 6,141,655 A | 10/2000 | Johnson et al. | |
| 6,154,741 A | 11/2000 | Feldman | |
| 6,182,121 B1 | 1/2001 | Wlaschin | |
| 6,189,012 B1 | 2/2001 | Mital et al. | |
| 6,192,273 B1 | 2/2001 | Igel et al. | |
| 6,192,373 B1 | 2/2001 | Haegele | |
| 6,199,195 B1 | 3/2001 | Goodwin et al. | |
| 6,208,993 B1 | 3/2001 | Shadmon | |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,330,573 B1 | 12/2001 | Salisbury et al. | |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,427,123 B1 | 7/2002 | Sedlar | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,519,597 B1* | 2/2003 | Cheng et al. | 1/1 |
| 6,539,398 B1 | 3/2003 | Hannan et al. | |
| 6,549,916 B1 | 4/2003 | Sedlar | |
| 6,571,231 B2 | 5/2003 | Sedlar | |
| 6,584,459 B1 | 6/2003 | Chang et al. | |
| 6,604,100 B1 | 8/2003 | Fernandez et al. | |
| 6,609,121 B1 | 8/2003 | Ambrosini et al. | |
| 6,636,845 B2 | 10/2003 | Chau et al. | |
| 6,643,633 B2 | 11/2003 | Chau et al. | |
| 6,662,342 B1 | 12/2003 | Marcy | |
| 6,684,227 B2 | 1/2004 | Duxbury | |
| 6,697,805 B1 | 2/2004 | Choquier et al. | |
| 6,704,739 B2 | 3/2004 | Craft et al. | |
| 6,704,747 B1 | 3/2004 | Fong | |
| 6,708,186 B1 | 3/2004 | Claborn et al. | |
| 6,718,322 B1 | 4/2004 | Brye | |
| 6,725,212 B2 | 4/2004 | Couch et al. | |
| 6,754,661 B1 | 6/2004 | Hallin et al. | |
| 6,772,350 B1 | 8/2004 | Belani et al. | |
| 6,785,673 B1 | 8/2004 | Fernandez et al. | |
| 6,801,224 B1 | 10/2004 | Lewallen | |
| 6,826,553 B1 | 11/2004 | DaCosta et al. | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,920,457 B2 | 7/2005 | Pressmar | |
| 6,964,025 B2 | 11/2005 | Angiulo et al. | |
| 6,996,571 B2 | 2/2006 | McConnell | |
| 7,013,425 B2 | 3/2006 | Kataoka | |
| 7,031,956 B1 | 4/2006 | Lee et al. | |
| 7,043,488 B1 | 5/2006 | Bauer et al. | |
| 7,080,094 B2 | 7/2006 | Dapp et al. | |
| 7,096,224 B2 | 8/2006 | Murthy et al. | |
| 7,120,645 B2* | 10/2006 | Manikutty et al. | 1/1 |
| 7,139,746 B2 | 11/2006 | Shin et al. | |
| 7,143,397 B2 | 11/2006 | Imaura | |
| 7,162,485 B2 | 1/2007 | Gottlob et al. | |
| 7,171,404 B2 | 1/2007 | Lindblad et al. | |
| 7,171,407 B2 | 1/2007 | Barton et al. | |
| 7,216,127 B2 | 5/2007 | Auerbach | |
| 7,287,023 B2 | 10/2007 | Fan et al. | |
| 7,315,852 B2 | 1/2008 | Balmin et al. | |
| 7,366,735 B2 | 4/2008 | Chandrasekaran et al. | |
| 7,370,061 B2 | 5/2008 | Chakraborty et al. | |
| 7,467,157 B1* | 12/2008 | Chen et al. | 1/1 |
| 7,603,347 B2* | 10/2009 | Thusoo et al. | 1/1 |
| 7,747,610 B2* | 6/2010 | Chinchwadkar et al. | 707/716 |
| 2001/0049675 A1 | 12/2001 | Mandler et al. | |
| 2002/0056025 A1 | 5/2002 | Qiu et al. | |
| 2002/0073019 A1 | 6/2002 | Deaton | |
| 2002/0078068 A1 | 6/2002 | Krishnaprasad et al. | |
| 2002/0116371 A1 | 8/2002 | Dodds et al. | |
| 2002/0116457 A1 | 8/2002 | Eshleman et al. | |
| 2002/0133484 A1 | 9/2002 | Chau et al. | |
| 2002/0143512 A1 | 10/2002 | Shamoto et al. | |
| 2002/0152267 A1 | 10/2002 | Lennon | |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2002/0188613 A1 | 12/2002 | Chakraborty et al. | |
| 2003/0004937 A1 | 1/2003 | Salmenkaita et al. | |
| 2003/0009361 A1 | 1/2003 | Hancock et al. | |
| 2003/0065659 A1 | 4/2003 | Agarwal et al. | |
| 2003/0078906 A1 | 4/2003 | Ten-Hove et al. | |
| 2003/0093672 A1 | 5/2003 | Cichowlas | |
| 2003/0101194 A1 | 5/2003 | Rys et al. | |
| 2003/0131051 A1 | 7/2003 | Lection et al. | |
| 2003/0140311 A1 | 7/2003 | Lemon et al. | |
| 2003/0167456 A1 | 9/2003 | Sabharwal | |
| 2003/0172135 A1 | 9/2003 | Bobick et al. | |
| 2003/0177341 A1 | 9/2003 | Devillers | |
| 2003/0182624 A1 | 9/2003 | Large | |
| 2003/0212662 A1 | 11/2003 | Shin et al. | |
| 2003/0212664 A1 | 11/2003 | Breining et al. | |
| 2004/0010752 A1 | 1/2004 | Chan et al. | |
| 2004/0043758 A1 | 3/2004 | Sorvari et al. | |
| 2004/0044659 A1 | 3/2004 | Judd et al. | |
| 2004/0064466 A1 | 4/2004 | Manikutty et al. | |
| 2004/0068494 A1 | 4/2004 | Tozawa et al. | |
| 2004/0088320 A1 | 5/2004 | Perry | |
| 2004/0103105 A1 | 5/2004 | Lindblad et al. | |
| 2004/0148278 A1 | 7/2004 | Milo et al. | |
| 2004/0149278 A1 | 8/2004 | Lin | |
| 2004/0167864 A1 | 8/2004 | Wang et al. | |
| 2004/0176958 A1 | 9/2004 | Salmenkaita et al. | |
| 2004/0205551 A1 | 10/2004 | Santos | |
| 2004/0220912 A1 | 11/2004 | Manikutty et al. | |
| 2004/0225680 A1 | 11/2004 | Cameron et al. | |
| 2004/0230667 A1 | 11/2004 | Wookey | |
| 2004/0267760 A1 | 12/2004 | Brundage et al. | |
| 2005/0033733 A1 | 2/2005 | Shadmon et al. | |
| 2005/0038688 A1 | 2/2005 | Collins et al. | |
| 2005/0050016 A1 | 3/2005 | Stanoi et al. | |
| 2005/0050058 A1 | 3/2005 | Jain et al. | |
| 2005/0050092 A1 | 3/2005 | Jain et al. | |
| 2005/0091188 A1 | 4/2005 | Pal et al. | |
| 2005/0097084 A1* | 5/2005 | Balmin et al. | 707/3 |
| 2005/0108630 A1 | 5/2005 | Wasson et al. | |
| 2005/0120031 A1 | 6/2005 | Ishii | |
| 2005/0187897 A1 | 8/2005 | Pawar et al. | |
| 2005/0228791 A1 | 10/2005 | Thusoo et al. | |
| 2005/0228792 A1 | 10/2005 | Chandrasekaran et al. | |
| 2005/0228818 A1 | 10/2005 | Murthy et al. | |
| 2005/0229158 A1 | 10/2005 | Thusoo et al. | |
| 2005/0257201 A1 | 11/2005 | Rose et al. | |
| 2005/0278616 A1 | 12/2005 | Eller | |
| 2005/0289125 A1 | 12/2005 | Liu et al. | |
| 2006/0080345 A1 | 4/2006 | Murhy et al. | |
| 2006/0129584 A1 | 6/2006 | Hoang et al. | |
| 2006/0184551 A1 | 8/2006 | Tarachandani et al. | |
| 2006/0195476 A1 | 8/2006 | Nori et al. | |
| 2007/0250527 A1 | 10/2007 | Murthy et al. | |
| 2008/0098001 A1 | 4/2008 | Gupta et al. | |
| 2008/0098019 A1 | 4/2008 | Sthanikam et al. | |
| 2008/0098020 A1 | 4/2008 | Gupta et al. | |

FOREIGN PATENT DOCUMENTS

| WO | WO 2004/049533 A2 | 8/2000 |
|---|---|---|
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

Bayardo, R. et al., "Optimizing encoding: An Evaluation of Binary XML Encoding Optimizations For Fast Stream Based XML Processing," May 2004, Proceedings of the 13th International conference on World Wide Web WWW 04', Published ACM press, 10 pages.

Bouret, R. et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000 (pp. 134-143).

Braga, D. et al., "A Graphical Environment to Query XML Data with Query," Proc. Fourth International Conference on Web Information Systems Engineering (WISE '03), 2003, IEEE (10 pages).

Chae, M. et al., "Design and Implementation of an Object-Oriented Multimedia DBMS Tightly Couple with Information Retrieval Functions," Proc. Seventeenth IASTED International Conference on Applied Informatics, Feb. 15-18, 1999, abstract.

Chakraborty, K., "The XML Garbage Collector," The Source for Developers, Sun Developer Network Site XP-002297849, Mar. 2002.

Chen, R. et al., "Developing an XML framework for metadata system," Trinity College Dublin, Proc. Of First International Symposium on Information and Communication (pp. 267-272).

Cheng, J. et a., "IBM DB2 XML Extender," IEEE, ICDE '00 Conference, San Diego, Feb. 2000, 130 pages.

Cooper, Brian F. et al., "A Fast Index for Semistructured Data," Proc. Of the International Conference on Very Large Databases, 2001, XP-002303292 (pp. 341-350).

Cormen, T. et al., "Introduction to Algorithms," MIT Press, 2001, 2nd Edition, 3 pages.

Diao, Y. et al., "Path Sharing and Predicate Evaluation for High Performance XML Filtering," XP-002344354 ACM Transactions on Database Systems (2003), pp. 467-516.

Diao, Y. et al., "YFilter: Efficient and Scalable Filtering of XML Documents," IEEE (2002) 2 pages.

Draper, D., "Mapping Between XML and Relational Data" [online], Feb. 6, 2004 [retrieved on Aug. 17, 2004]. Retrieved from the Internet: < http://www.awprofessional.com/articles/printerfriendly.asp?p-169590 > 16 pages.

Giradot, M. et al., "Millau: an encoding format for efficient representation and exchange of XMLover the Web" IBM Almaden Research Center, 2008, 24 pages.

Helmer, S. et al., "Optimized Translations of XPath into Algebraic Expressions Parameterized by Programs Containing Navigational Primitives" IEEE (2002) 10 pages.

Jonah, K., Databases Tag Along with XML [online] Jul. 1, 2002 [retrieved on Aug. 17, 2004]. Retrieved from the Internet: < http://www.gcn.com/21_17/guide/19148-1,html > 3 pages.

Kudrass, T., "Management of XML Documents Without Schema in Relational Database Systems," Information and Software Technology, vol. 44, No. 4, Mar. 31, 2002, XP-004347776, pp. 269-275.

Lehman, M., "From XML to Storage and Back" [online] retrieved on Aug. 17, 2004]. Retrieved from the Internet: < http://www.oracle.com/technology/oramag/oracle/03-mar/023xml.html > 8 pages.

Liefke, H.et al., "Xmill: an efficient compressor for XML data," May 2000, ACM SIGMOD Record, Proceedings of the 2000 ACM SIGMOD international conference on Management of data SIGMOD 00, vol. 29 Issue 2, Publisher: ACM Press, 12 pages.

Liu, S. et al., "XML retrieval: Configurable indexing and ranking for XML information retrieval," Jul. 2004, Proceedings of the 27th annual international ACM SIGIR conference on Research and development in information retrieval SIGIR 04', Published by ACM press, 8 pages.

Lo, M. et al., "XAS: A System for Accessing Componentized, Virtual XML Documents," IEEE, 2001, pp. 493-502.

MacKenzie, D. et al., "Finding Files," FindUtils, Version 4.1.2, Nov. 1994, 39 pages.

Manolescu, D., Review of "Metadata solutions: using metamodels, repositories, XML, and enterprise portals to generate information on demand by Adrienne Tannenbaum," Mar. 2003, ACM Press, vol. 28, Issue 2, p. 38.

McHugh, J. et al., "Query Optimization for XML," XP-002333353, Proc. of the 25th VLDB Conference (1999) pp. 315-326.

McHugh, J. et al., "Indexing Semistructured Data," Stanford Science Department, 1998, XP-002248313, pp. 1-21.

Min, J. et al., "XML Indexing and compression: XPRESS: a queriable compression for XML data," Jun. 2003, Proceedings of the 2003 ACM SIGMOD international conference on Management of data SIGMOD 03', Published by ACM Press, 12 pages.

Mitchell, N, "Data Shredding, Updating the Status Bar, and More," [online], Feb. 2003 [retrieved on Aug. 17, 2004]. Retrieved from the Internet: < http://msdn.microsoft.com/msdnmag/issues/03/03/WebQA/ > 6 pages.

Myllymaki, J., "Effective Web Data Extraction with Standard XML Technologies," WWW10, May 1-5, 2001, pp. 689-696.

Noser, H. et al., "Dynamic 3D Visualization of Database-Defined Tree Structures on the WWW by Using Rewriting Systems," 2000, IEEE, XP-002262516, pp. 247-254.

Peng, F. et al., "XPath queries on streaming data" (2003) ACM Press, pp. 431-442.

Schmidt, A. et al., "Why and How to Benchmark XML Databases," SIDMOND Record, vol. 3, No. 3, Sep. 2001, pp. 27-32.

Shankar, P. et al., "Indexing XML Data Stored in a Relational Database," Proceedings of the 30th VLDB Conference, 2004, 12 pages.

Stonebraker, M., "The Case for Partial Indexes", 1989, 8 pages.

Vion-Dury, J., "XPath on Left and Right Sides of Rules: Toward Compact XML Tree Rewriting Through Node Patterns," (2003) ACM Press, pp. 19-25.

Vorthman, S. et al., "Beyond Schemas, Schema Adjuncts and the Outside World," Markup Languages, Online!, vol. 2, No. 3, Jun. 2000, pp. 1-8.

W3C, "XML Fragment Interchange," W3C Working Draft, Jun. 30, 1999, XP-002167090, 17 pages.

W3C, "XML Fragment Interchange," W3C Candidate Recommendation, Feb. 12, 2001, pp. 1-16.

W3C, XML Path Language (XPath) Version 1.0, W3C Recommendation Nov. 16, 1999 [online] Copyright 1999 [retrieved on Aug. 16, 2004]. Retrieved from the Internet:< http://www.w3.org/TR/xpath > 37 pages.

Yoshikawa, M. et al., "XRel: A Path-Based Approach to Storage and Retrieval of XLM Documents Using Relational Databases," XP-001143686, ACM Transactions on Internet Technology (2001) pp. 110-141.

Zhang, W. et al., "An Encoding Scheme for Indexing XML Data," E-Commerce and E-Service, 2004, XP-010697639, pp. 526-529.

Zisman, A. et al., "Using XML to Build Consistency Rules for Distributed Specifications," Proc. Of the Tenth International Worship on Software Specification and Design (IWSD'00), IEEE 2000, 8 pages.

Zou, Q. et al., "XML Processing: Ctree: a compact tree for indexing XML data" Nov. 2004, Proceedings of the 6th annual international workshop on Web information and data management WIDM 04', Published by ACM Press, 7 pages.

* cited by examiner

GLOBAL QUERY NORMALIZATION TO IMPROVE XML INDEX BASED REWRITES FOR PATH SUBSETTED INDEX

RELATED APPLICATIONS

This application is related to U.S. patent application Ser. No. 11/059,665, entitled "EFFICIENT QUERIBILITY AND MANAGEABILITY OF AN XML INDEX WITH PATH SUBSETTING", filed by Ashish Thusoo et al. on Feb. 15, 2005, the entire contents of which is hereby incorporated by reference for all purposes as if fully set forth herein.

This application is related to U.S. patent application Ser. No. 11/401,613, entitled "A MECHANISM FOR IMPROVING PERFORMANCE ON XML OVER XML DATA USING PATH SUBSETTING", filed by Asha Tarachandani, et al. on Apr. 10, 2006, the entire contents of which is hereby incorporated by reference for all purposes as if fully set forth herein.

FIELD OF THE INVENTION

The present invention relates to managing information and, more specifically, efficiently managing and querying XML documents.

BACKGROUND

In recent years, database systems that allow storage and querying of eXtensible Markup Language data ("XML data") have been developed. Though there are many evolving standards for querying XML, most of them usually include some variation of XPath. XPath is a language that describes a way to locate and process items in XML documents by using an addressing syntax based on a path through the document's logical structure or hierarchy. The portion of an XML document identified by an XPath "path expression" is the portion that resides, within the structure of the XML document, at the end of any path that matches the path expression.

A query that uses a path expression to identify one or more specific pieces of XML data is referred to herein as a path-based query. The process of determining which XML data corresponds to the path designated in a path-based query is referred to as "evaluating" the path expression.

Unfortunately, even database systems that have built-in support for storing XML data are usually not optimized for handling path-based queries, and the query performance of the databases systems leaves much to be desired. In specific cases where an XML schema definition may be available, the structure and data types used in XML instance documents may be used to optimize path-based queries. However, in cases where an XML schema definition is not available, and the documents to be searched do not conform to any schema, there are no efficient techniques for path-based querying.

Some database systems may use ad-hoc mechanisms to satisfy path-based queries that are run against documents where the schema of the documents is not known. For example, a database system may satisfy a path-based query by performing a full scan of all stored XML documents. While a full scan of all documents can be used to satisfy all path-based queries, the implementation would be very slow due to the lack of indexes.

Another way to satisfy path-based queries involves the use of text keywords. Specifically, many database systems support text indexes, and these could be used to satisfy certain path expressions. However, this technique can only satisfy a small subset of path-based queries, and in particular, cannot satisfy path-based querying.

Consequently, XML indexes that can be used to quickly evaluate a path-based query have been developed. An example of such an XML index is described in U.S. patent application Ser. No. 10/884,311, entitled "INDEX FOR ACCESSING XML DATA", filed by Sivasankaran Chandrasekar et al., on Jul. 2, 2004, the entire contents of which is hereby incorporated by reference for all purposes as if fully set forth herein. XML indexes enable XML data to be searched without a sequential scan of all of the XML data. XML indexes are typically built using all available XML data in the database.

However, XML documents that are being stored in a database may include several paths that will never be used in a path-based query. For example, document-oriented XML data may include formatting elements that will typically not be used in path-based queries. Therefore, any XML path-based index that indexes all paths in XML documents stored in a database will needlessly include data that will not be used. As more paths are indexed, and the index grows, execution of queries that use such an index are likely to become slower.

U.S. patent application Ser. Nos. 11/059,665 and 11/401,613 describe how only those path expressions that are more likely to be the subject of a path-based query are indexed. Such indexes are referred to herein as path-subsetted indexes. A path-subsetted index thus indexes a proper (or strict) subset of the XML nodes in a document. Path-subsetted indexes are defined in at least two ways. In the case of an INCLUDE path-subsetted XML index, the subset of XML nodes to be indexed is specified using a set of one or more path expressions. All XML nodes that fall within the sub-tree rooted at any node matching one of the path expressions in the set are indexed.

An EXCLUDE path-subsetted XML index is defined in a similar fashion. An EXCLUDE path-subsetted XML index is defined by specifying a set of one or more path expressions. The index does not index any XML node that is within the sub-tree rooted at any node matching any of the path expressions in the set.

Hereinafter, path expressions that correspond to indexed nodes are referred to as "subsetted paths."

An XML index is typically used for node identification as well as fragment extraction. Node identification is the process of identifying nodes matching a certain criteria (e.g., nodes whose corresponding path expression is equal to a subsetted path). Fragment extraction is the process of constructing document fragments. Because fragment extraction requires namespace patching, an INCLUDE path-subsetted XML index may also index all nodes in a subsetted path from the document root to any indexed XML node.

A path expression in a query may not be "satisfiable" by a path-subsetted XML index. A path expression is "satisfiable" by a path-subsetted XML index if all XML nodes that match the path expression are indexed in the path-subsetted XML index.

With a path-subsetted index, new documents that are being added to a database may be quickly and efficiently parsed such that only path expressions that match a "path subsetting" rule are added to the index. In addition, an incoming path-based query may be quickly and efficiently examined to determine whether the specified path could be satisfied by an index before attempting to evaluate the path expression using the index.

However, database systems typically normalize received path-based queries before the database server determines whether an index may be used to process the path-based queries. Under a typical normalization phase, a complex path expression is decomposed into multiple "mini" path expressions. The database system then determines whether each of the "mini" path expressions is "satisfiable" by an index. If any of the "mini" path expressions are not satisfiable by an index, then an index is not used to retrieve data that satisfies any of the "mini" path expressions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
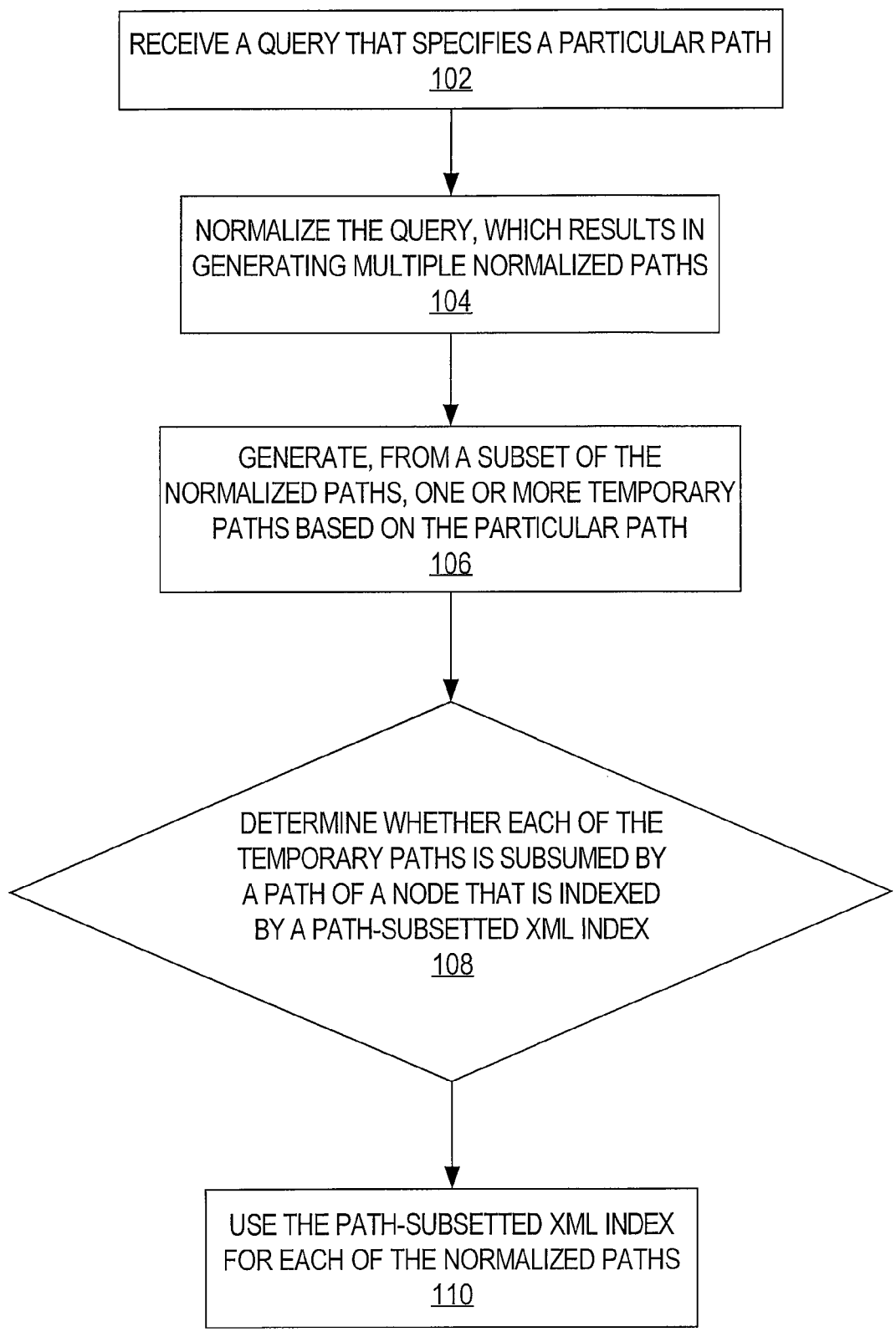
FIG. 1 is a flow diagram that depicts how a path-based query may be processed to determine whether a path-subsetted XML index may be used to execute the path-based query, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided that improve the performance of path-based queries that are not satisfiable by a path-subsetted XML index. When a query processor analyzes and path-based query and generates multiple path expressions, the query processor also maintains information about the original path expression. The query processor uses this information to determine whether the multiple path expressions are satisfiable by the path-subsetted XML index. The multiple path expressions may be modified with the information and then compared to the subsetted paths of the XML index. If each of the modified path expressions is satisfiable by the path-subsetted XML index, then the path-subsetted XML index may be used to process the path-based query.

For purposes of brevity, a path expression is referred to herein as a "path."

Although the following description refers to a path-based query that specifies a single path, embodiments of the invention are also applicable to path-based queries that specify multiple paths.

Example Path-Subsetted XML Index

Although not so limited, embodiments of the invention are described in the context of a path-subsetted XML index that indexes nodes that satisfy the following paths.

/PurchaseOrder/Reference
/PurchaseOrder/User
/PurchaseOrder/LineItems/LineItem/Part/@Id In an embodiment, a path-subsetted XML index indexes the following three sets of nodes: (1) all nodes that match any of the specified paths; (2) all descendants of any of the nodes in (1); and (3) all ancestor nodes of any nodes in (1). For example, given specified path "/PurchaseOrder/Reference", the above path-subsetted XML index may also index all XML nodes whose paths match "/PurchaseOrder[Reference]" or "/PurchaseOrder/Reference" or are subsumed by "/PurchaseOrder/Reference//*." Similarly, given the specified path "PurchaseOrder/User", the above path-subsetted XML index may also index all XML nodes whose paths match "/PurchaseOrder[User]" or "/PurchaseOrder/User" or are subsumed by "/PurchaseOrder/User//*".

Example Query

To continue the example, after the above path-subsetted XML index is generated, the following path-based query is received:

```
select object_value
from PURCHASEORDER
where XMLExists
(
    '$p/PurchaseOrder[Reference="REFERENCE"]'
    passing object_value as "p"
)
```

Execution of this path-based query retrieves all PurchaseOrder nodes that have a Reference child whose text value is the string "REFERENCE". In this example, the path-based query conforms to the SQL/XML query language. The path-based query may have been submitted by a user or may have been generated from another path-based query. The other path-based query may conform to another query language, such as the XQuery query language.

Normalization

In typical database systems, such as Oracle XML DB™, many queries undergo normalization processing. A purpose of normalization is to decompose "complex" paths, which cannot be evaluated by a single operator, into "simple" paths that can be individually evaluated, e.g., using an index. The results of the individual evaluations are then joined based on certain constraints, such as a comparison among order key values. An example of a simple path is one that does not include any predicates, such as "/PurchaseOrder/User". An example of a complex path is one that includes one or more predicates, such as "/PurchaseOrder/User[@Id=123]".

A path-based query that is not yet normalized is referred to herein as an "original query." Each path specified in an original query is referred to herein as an "original path." Thus, an original query may include multiple original paths.

An original query may or may not be the query that a database system receives from a client. For example, an original query may be a SQL/XML query that a database system generates from an XQuery query.

During the normalization phase, an original query, as in the example above, is transformed into an equivalent query without complex paths. The equivalent query that results from a normalization phase is referred to herein as a "normalized query." One stage of normalization involves decomposing the original path into multiple paths. The multiple paths that are generated from the original path during a normalization phase are referred to herein as "normalized paths." Thus, the normalized query that is generated during a normalization phase includes the normalized paths.

As an example, the example original query described above may be rewritten to the following normalized query:

```
SELECT SYS_MAKEXML(0,"PURCHASEORDER"."XMLDATA") "OBJECT_VALUE"
FROM "XMARK"."PURCHASEORDER" "PURCHASEORDER"
WHERE CASE WHEN EXISTS
(
    SELECT NULL "SYS_XQCON2SEQ(VALUE(P))"
    FROM
    (
        SELECT VALUE(KOKBF$) "COLUMN_VALUE"
        FROM TABLE
        (
            "SYS"."XMLSEQUENCE"
            (
                EXTRACT(SYS_MAKEXML(0,"PURCHASEORDER"."XMLDATA"),
                '/PurchaseOrder')
            )
        ) "KOKBF$"
    ) "P"
    WHERE EXISTS
    (
        SELECT NULL "SYS_XQCON2SEQ(VALUE(P))" FROM
        (
            SELECT VALUE(KOKBF$) "COLUMN_VALUE"
            FROM TABLE
            (
                "SYS"."XMLSEQUENCE"
                (
                    EXTRACT("P"."COLUMN_VALUE",'/PurchaseOrder/
                    Reference')
                )
            ) "KOKBF$"
        ) "P"
        WHERE TO_CHAR(SYS_XQ_UPKXML2SQL(SYS_XQEXVAL
        (
            SYS_XQEXTRACT("P"."COLUMN_VALUE",'/Reference'),1,5
            0
        ),50,1,0))='REFERENCE'
    )
)
THEN 1 ELSE 0 END =1
```

Normalization of the original query transforms the XMLExists function in the original query to an EXISTS sub-query in the normalized query. The EXISTS sub-query includes three normalized paths: "/PurchaseOrder", "/PurchaseOrder/Reference", and "/Reference".

Normalized Query Rewrite

After normalization, the normalized query goes through a rewrite phase where checks are performed on each normalized path in the normalized query. During a typical rewrite phase, each EXTRACT operator is analyzed and rewritten independent of other EXTRACT operators into a sub-query that accesses a XML index. However, because "/PurchaseOrder" is not satisfiable by the path-subsetted XML index (i.e., "/PurchaseOrder" is not one of the subsetted paths of the index), the corresponding EXTRACT operator is not rewritten to use the path-subsetted XML index. Based on an analysis of only the normalized query (referred to herein as "local query analysis"), the database server cannot conclude that the EXTRACT operator corresponding to "/PurchaseOrder" can use the path-subsetted XML index because not all PurchaseOrder nodes are stored in the path-subsetted XML index. Instead, only PurchaseOrder nodes that are in the path from the document root to any indexed XML node (e.g., "/PurchaseOrder/Reference" and "/PurchaseOrder[Reference]" nodes in this example) are indexed in the path-subsetted XML index.

Global Query Analysis

According to an embodiment of the invention, a path-based query, from which the normalized query is derived, is analyzed to determine whether a path-subsetted XML index can be used to execute a normalized path. This type of analysis is referred to herein as "global query analysis." With global query analysis, a database system can know that, in the normalized query above, a PurchaseOrder element in the output of the EXTRACT operator that corresponds to normalized path "/PurchaseOrder" can affect the overall query result if the PurchaseOrder element has a child element named "Reference". All such PurchaseOrder nodes must be indexed by the path-subsetted XML index. For example, if the path-subsetted XML index includes a path table, then the path table must include an entry for a "/PurchaseOrder[Reference]"

path. Therefore, with global query analysis, there is sufficient information to rewrite the EXTRACT operators in the normalized query to use the path-subsetted XML index.

In an embodiment, information from the normalization phase is maintained in order to determine whether normalized paths may be rewritten to use a path-subsetted XML index. For example, when the original path is decomposed into multiple normalized paths, the normalized paths are associated with the original path. A path tree may be generated where the root node in the path tree corresponds to the original path. The root node has multiple child nodes that each correspond to a different normalized path.

As another example, information from the normalization phase may include data that indicates that the EXTRACT operators in the normalized query originate from the same (e.g., XMLExists) operator in the original query.

With this information, the database system is able to use the path-subsetted XML index to process the EXTRACT operators (i.e., that correspond to the normalized paths) in the normalized query. Determining that operators may be processed using an index almost always leads to better execution plans relative to execution plans that do not include an index.

Annotated Normalized Paths

In an embodiment, one or more of the normalized paths (or copies of the normalized paths) are annotated with information from the original path. Given the example above, the original path is "/PurchaseOrder [Reference='REFERENCE']" and the normalized paths are "/PurchaseOrder", "/PurchaseOrder/Reference", and "/Reference". At least two of these normalized paths are annotated to generate the following annotated paths: "/PurchaseOrder [Reference]" corresponding to normalized path "/PurchaseOrder" and "/PurchaseOrder/Reference" corresponding to normalized path "/Reference". The normalized path "/PurchaseOrder/Reference" is not required to be annotated.

Each annotated path (including any non-annotated paths) is compared against one or more subsetted paths associated with an XML index. If any of the annotated paths (or non-annotated paths) does not match any of the subsetted paths associated with an XML index, then that XML index cannot be used to process the normalized query.

Functional Overview

FIG. 1 is a flow diagram that depicts how a path-based query may be processed to determine whether a path-subsetted XML index may be used to execute the path-based query, according to an embodiment of the invention. Although the following description of FIG. 1 refers to a database system performing certain steps, multiple processes within the database system may be performing the various steps. Furthermore, embodiments of the invention are not limited to the type of database system. For example, the database system may comprise a multi-node database server or a single node database server. As another example, the database system may be a "shared everything" or a "shared nothing" database system.

At step 102, a database system receives a query that specifies a particular path. At step 104, the database system normalizes the query, which includes generating a plurality of normalized paths that are each derived from the particular path.

At step 106, the database system generates, from one or more of the normalized paths, one or more temporary paths based on the particular path. At step 108, the database system determines whether each of the temporary paths is subsumed by a path of a node that is indexed by a path-subsetted XML index. A first path is "subsumed" by a second path if the node represented by the second path includes the node represented by the first path. For example, given the above path-subsetted XML index, "/PurchaseOrder" is not subsumed by "/PurchaseOrder/Reference"; however, "/PurchaseOrder/Reference/@id" is subsumed by "PurchaseOrder/Reference". Also, "/PurchaseOrder[Reference]" is subsumed by "/'PurchaseOrder/Reference."

If each of the temporary paths is subsumed by a path of a node that is indexed by a path-subsetted XML index, then, at step 110, the database system uses the path-subsetted XML index for each of the normalized paths.

Tree Comparison

Figure 2:
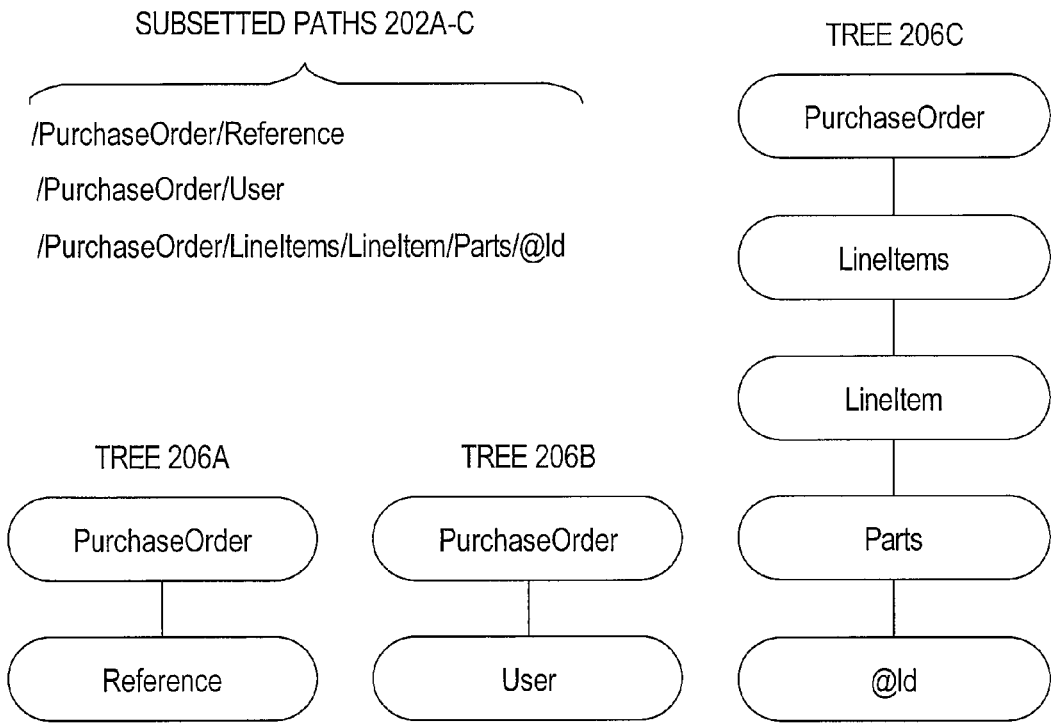
FIG. 2 is a block diagram that depicts annotated path expressions modeled as trees of nodes, according to an embodiment of the invention.
Figure 2:
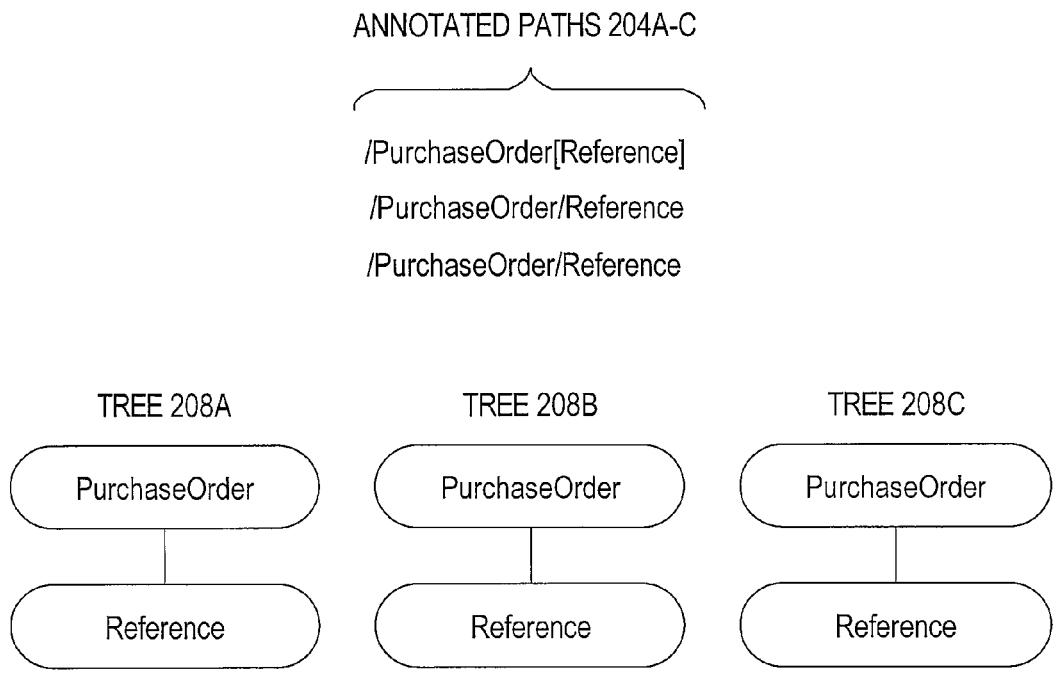

FIG. 2 is a block diagram that depicts annotated paths modeled as trees of nodes, according to an embodiment of the invention. FIG. 2 depicts two sets of paths: (a) subsetted paths 202A-B of the XML index defined previously and (b) annotated paths 204A-C that correspond to the normalized paths described previously. Although normalized path "/PurchaseOrder/Reference" is not required to be annotated, for purposes of brevity, that path is also referred to as an annotated path (e.g., annotated path 204B).

For each subsetted path 202 and annotated path 204, a tree of nodes is generated. Tree 206A is generated from subsetted path 202A, tree 206B is generated from subsetted path 202B, and so forth. Similarly, tree 208A is generated from annotated path 204A, tree 208B is generated from annotated path 204B, and so forth.

Alternatively, a single tree may be generated from subsetted paths 202A-C. In that case, the common root node of that single tree would correspond to the PurchaseOrder element and the immediate children nodes of the root node would correspond to the Reference, User, and LineItems elements. The nodes corresponding to the LineItem, Parts, and @Id elements would still be descendants of the node corresponding to the LineItems element.

Each tree 208 is compared, node by node, to each tree 206 until a match is achieved. If one of trees 208A-C does not match any of trees 206A-C, then the XML index corresponding to subsetted paths 202A-C cannot be used to process the normalized query corresponding to annotated paths 204A-C. In the example depicted in FIG. 2, each of trees 208A-C matches tree 206A. Therefore, the XML index corresponding to subsetted paths 202A-C is used to process the example normalized query described previously.

Hardware Overview

Figure 3:
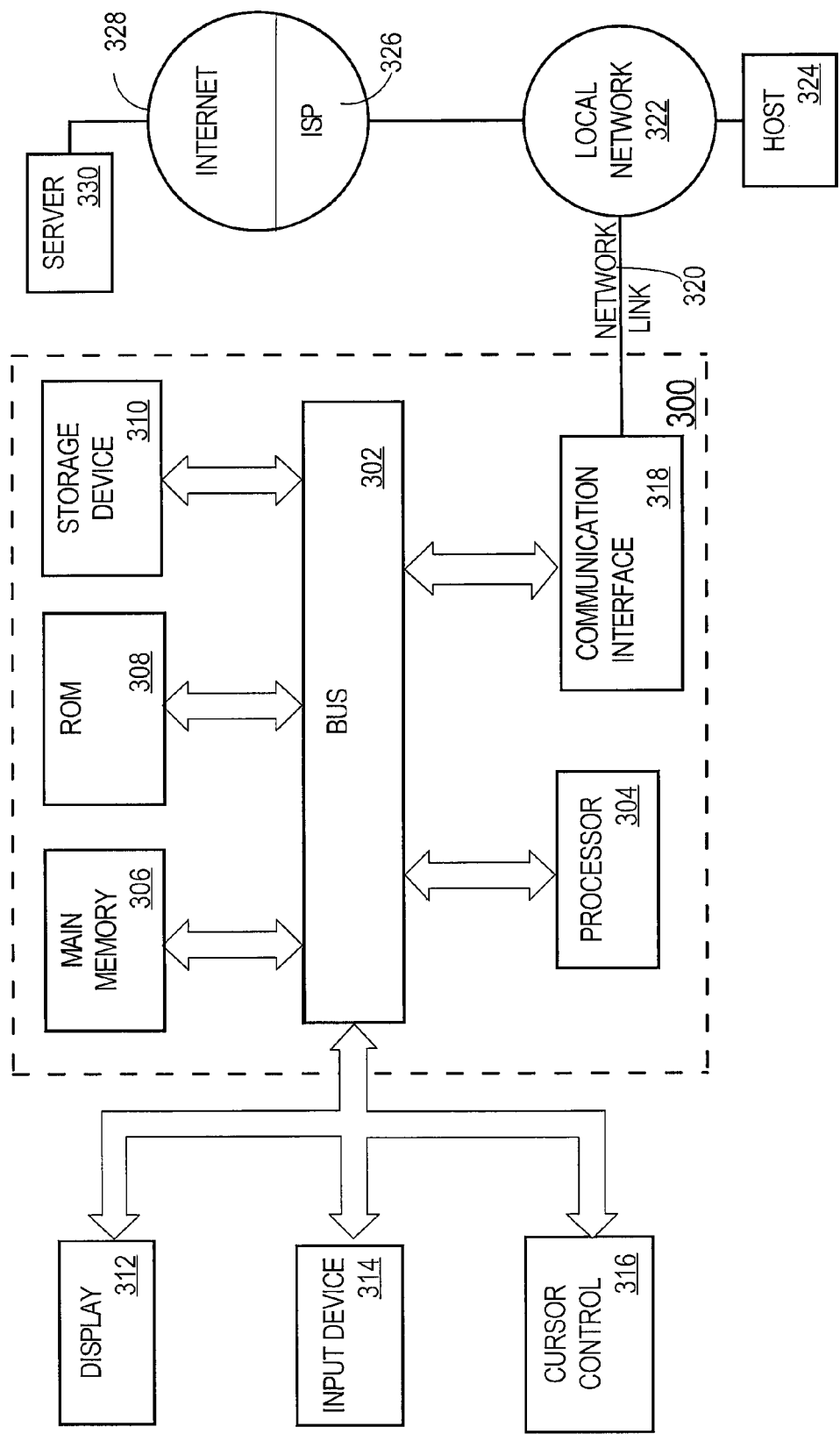
FIG. 3 is a block diagram that depicts a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
 receiving a query that specifies a particular path expression;
 normalizing the query to generate a normalized query, wherein normalizing the query comprises generating, based on the particular path expression, a plurality of normalized path expressions;
generating, based on the particular path expression, from a subset of the plurality of normalized path expressions, one or more temporary path expressions;
determining whether each of the one or more temporary path expressions is subsumed by a path of a node that is indexed by a path-subsetted XML index that is associated with one or more subsetted path expressions that indicate a set of one or more nodes that are indexed by said path-subsetted XML index; and
in response to determining that each of the one or more temporary path expressions is subsumed by a path of a node that is indexed by said path-subsetted XML index, using the path-subsetted XML index to process the plurality of normalized path expressions;
wherein the method is performed by one or more computers.

2. The method of claim 1, wherein generating the one or more temporary path expressions includes modifying the subset of the plurality of normalized path expressions to include information from the particular path expression.

3. The method of claim 1, wherein the query conforms to the SQL/XML query language.

4. The method of claim 3, further comprising:
receiving a previous query that conforms to the XQuery query language; and
generating the query based on the previous query.

5. The method of claim 1, wherein at least a subset of the one or more subsetted path expressions are specified in a definition of the path-subsetted XML index.

6. The method of claim 1, wherein:
each subsetted path expression of the one or more subsetted path expressions is not in a particular set of path expressions;
the particular set of path expressions is specified in a definition of the path-subsetted XML index; and
each path expression in the particular set of path expressions specifies one or more nodes that are not indexed by the path-subsetted XML index.

7. The method of claim 1, wherein each normalized path expression in a subset of the plurality of normalized path expressions is subsumed by a subsetted path expression of the one or more subsetted path expressions.

8. The method of claim 1, further comprising:
for each temporary path expression of the one or more temporary path expressions, generating a first tree of nodes, wherein each node in the first tree corresponds to an element in said each temporary path expression; and
for each subsetted path expression of the one or more subsetted path expressions, generating a second tree of nodes, wherein each node in the second tree corresponds to an element in said each subsetted path expression;
wherein determining whether each of the one or more temporary path expressions is subsumed by a path of a node that is indexed by the path-subsetted XML index includes determining whether each first tree is equivalent to one of the second trees.

9. The method of claim 1, wherein:
the normalized query includes a plurality of extract operators, none of which appear in said query;
each extract operator of the plurality of extract operators takes as input a different normalized path expression of the plurality of normalized path expressions; and
using the path-subsetted XML index to process the plurality of normalized path expressions comprises rewriting each extract operator to use the path-subsetted XML index.

10. One or more non-transitory machine-readable media storing instructions which, when executed by one or more processors, cause:
receiving a query that specifies a particular path expression;
normalizing the query to generate a normalized query, wherein normalizing the query comprises generating, based on the particular path expression, a plurality of normalized path expressions
generating, based on the particular path expression, from a subset of the plurality of normalized path expressions, one or more temporary path expressions;
determining whether each of the one or more temporary path expressions is subsumed by a path of a node that is indexed by a path-subsetted XML index that is associated with one or more subsetted path expressions that indicate a set of one or more nodes that are indexed by said path-subsetted XML index; and
in response to determining that each of the one or more temporary path expressions is subsumed by a path of a node that is indexed by said path-subsetted XML index, using the path-subsetted XML index to process the plurality of normalized path expressions.

11. The one or more non-transitory machine-readable media of claim 10, wherein generating the one or more temporary path expressions includes modifying the subset of the plurality of normalized path expressions to include information from the particular path expression.

12. The one or more non-transitory machine-readable media of claim 10, wherein the query conforms to the SQL/XML query language.

13. The one or more storage non-transitory machine-readable media of claim 12, wherein the instructions, when executed by the one or more processors, further cause:
receiving a previous query that conforms to the XQuery query language; and
generating the query based on the previous query.

14. The one or more non-transitory machine-readable media of claim 10, wherein at least a subset of the one or more subsetted path expressions are specified in a definition of the path-subsetted XML index.

15. The one or more non-transitory machine-readable media of claim 10, wherein:
each subsetted path expression of the one or more subsetted path expressions is not in a particular set of path expressions;
the particular set of path expressions is specified in a definition of the path-subsetted XML index; and
each path expression in the particular set of path expressions specifies one or more nodes that are not indexed by the path-subsetted XML index.

16. The one or more non-transitory machine-readable media of claim 10, wherein each normalized path expression in a subset of the plurality of normalized path expressions is subsumed by a subsetted path expression of the one or more subsetted path expressions.

17. The one or more non-transitory machine-readable media of claim 10, wherein the instructions, when executed by the one or more processors, further cause:
for each temporary path expression of the one or more temporary path expressions, generating a first tree of nodes, wherein each node in the first tree corresponds to an element in said each temporary path expression; and for each subsetted path expression of the one or more subsetted path expressions, generating a second tree of nodes, wherein each node in the second tree corresponds to an element in said each subsetted path expression;

wherein determining whether each of the one or more temporary path expressions is subsumed by a path of a node that is indexed by the path-subsetted XML index includes determining whether each first tree is equivalent to one of the second trees.

18. The one or more non-transitory machine-readable media of claim 10, wherein:

the normalized query includes a plurality of extract operators, none of which appear in said query;

each extract operator of the plurality of extract operators takes as input a different normalized path expression of the plurality of normalized path expressions; and using the path-subsetted XML index to process the plurality of normalized path expressions comprises rewriting each extract operator to use the path-subsetted XML index.

* * * * *

UNITED STATES PATENT AND TRADEMARK OFFICE
CERTIFICATE OF CORRECTION

| | | |
|---|---|---|
| PATENT NO. | : 7,991,768 B2 | Page 1 of 1 |
| APPLICATION NO. | : 11/937268 | |
| DATED | : August 2, 2011 | |
| INVENTOR(S) | : Baby et al. | |

It is certified that error appears in the above-identified patent and that said Letters Patent is hereby corrected as shown below:

On Title page, in column 1, under "Title", line 2, delete "INDEX BASED" and insert -- INDEX-BASED --, therefor.

In column 1, line 2, delete "INDEX BASED" and insert -- INDEX-BASED --, therefor.

In column 8, line 9-10, delete ""/'PurchaseOrder/Reference."" and insert -- "/PurchaseOrder/Reference." --, therefor.

In column 12, line 13, in Claim 10, after "expressions" insert -- ; --.

In column 12, line 36, in Claim 13, after "more" delete "storage".

Signed and Sealed this
Twenty-second Day of November, 2011

David J. Kappos
*Director of the United States Patent and Trademark Office*